United States Defensive Publication [19] (H) [11] T104,001

Kunter et al. [43] Mar. 6, 1984

[54] METHOD FOR RECOVERING GOLD FROM REFRACTORY ORES

[76] Inventors: Richard S. Kunter, 2614 S. Field St., Lakewood, Colo. 80227; John R. Turney, 12128 W. 70th Ave., Arvada, Colo. 80004

[21] Appl. No.: 536,222

[22] Filed: Sep. 26, 1983

Related U.S. Application Data

[63] Continuation of Ser. No. 349,149, Feb. 16, 1982, abandoned.

[51] Int. Cl.[3] ..... C01G 7/00

[52] U.S. Cl. ..... 75/118 R; 423/29; 204/119

[57] ABSTRACT

A process for pretreating refractory ores improves the recovery of gold from such ores upon subsequent cyanidation. After comminuting the ore and forming an aqueous slurry, the ore is subjected to pressurized oxidation at an elevated temperature. By adjusting the pH to below about 1.85 and maintaining the pressure and temperature above 300 psig and 160° C., respectively, very high recovery of gold can be achieved. Additionally, by maintaining a preselected soluble iron concentration in the slurry, the oxidation of the ore is promoted and proceeds at a more rapid rate.

1 Claim, No Sheets Drawing,

30 Pages Specification

The file of this unexamined application may be inspected and copies thereof may be purchased (849 O.G. 1221, Apr. 9, 1968).